United States Patent [19]

Drzaic et al.

[11] Patent Number: 5,285,299

[45] Date of Patent: * Feb. 8, 1994

[54] ENCAPSULATED LIQUID CRYSTAL APPARATUS HAVING LOW OFF-AXIS HAZE, OPERABLE BY A SINE-WAVE POWER SOURCE AND INCLUDING A DYE

[75] Inventors: Paul S. Drzaic; Peter H. van Konynenburg, both of Palo Alto, Calif.

[73] Assignee: Raychem Corporation, Menlo Park, Calif.

[*] Notice: The portion of the term of this patent subsequent to Oct. 20, 2009 has been disclaimed.

[21] Appl. No.: 766,419

[22] Filed: Sep. 26, 1991

Related U.S. Application Data

[63] Continuation-in-part of Ser. No. 382,862, Jul. 20, 1989, Pat. No. 5,156,452.

[51] Int. Cl.$^5$ ............................................. G02F 1/13
[52] U.S. Cl. ........................................ 359/52; 359/94; 359/98
[58] Field of Search ...................... 359/51, 52, 94, 98

[56] References Cited

U.S. PATENT DOCUMENTS

| | | | |
|---|---|---|---|
| 4,435,047 | 3/1984 | Fergason | 350/334 |
| 4,556,289 | 12/1985 | Fergason | 350/350 R |
| 4,579,423 | 4/1986 | Fergason | 350/334 |
| 4,605,824 | 8/1986 | Birlmeier et al. | 179/18 HB |
| 4,616,903 | 10/1986 | Fergason | 350/334 |
| 4,671,618 | 6/1987 | Wu et al. | 350/347 V |
| 4,685,771 | 8/1987 | West et al. | 350/347 V |
| 4,693,560 | 9/1987 | Wiley | 350/335 |
| 4,749,261 | 6/1988 | McLaughlin et al. | 350/339 R |
| 4,822,146 | 4/1989 | Yamanobe et al. | 350/348 |
| 4,844,596 | 7/1989 | Fergason | 350/345 |
| 4,856,876 | 8/1989 | Fergason | 350/350 F |
| 4,878,741 | 11/1989 | Fergason | 350/339 F |
| 4,890,902 | 1/1990 | Doane et al. | 350/347 V |
| 4,944,576 | 7/1990 | Lacker et al. | 350/334 |
| 4,994,204 | 2/1991 | Doane et al. | 252/299.01 |
| 5,089,904 | 2/1992 | Fergason | 359/51 |

Primary Examiner—Rolf Hille
Assistant Examiner—Minhloan Tran
Attorney, Agent, or Firm—Heller, Ehrman, White & McAuliffe

[57] ABSTRACT

A liquid crystal apparatus including a low birefringence encapsulated liquid crystal material in a containment medium. The liquid crystal material contains a dye that conforms to the structure of the liquid crystal material. The difference between the ordinary index of refraction and extraordinary index of refraction of the liquid crystal material is between about 0.050 and 0.115. The index of refraction of the containment is greater than the ordinary index of refraction of the liquid crystal material. The liquid crystal apparatus provides low haze at off-axis viewing angles, permits efficient sine-wave power operation, and provides energy control.

10 Claims, 3 Drawing Sheets

ENCAPSULATED LIQUID CRYSTAL APPARATUS HAVING LOW OFF-AXIS HAZE, OPERABLE BY A SINE-WAVE POWER SOURCE AND INCLUDING A DYE

This application is a continuation-in-part of application Ser. No. 07/382,862, filed Jul. 20, 1989, now U.S. Pat. No. 5,156,452.

FIELD OF THE INVENTION

The present invention relates generally to liquid crystal material, and more particularly to an encapsulated liquid crystal material, and to electrically-controllable glazing products.

BACKGROUND OF THE INVENTION

Liquid crystals may be used in a wide variety of devices, including architectural glazing products and visual display devices. The property of liquid crystals that enables them to be used in such devices is the ability of liquid crystals to transmit light on the one hand and to scatter light and/or absorb it (especially when combined with an appropriate dye) on the other, depending on whether the liquid crystals are in a relatively free, that is de-energized or field-off state, or in a relatively aligned, that is energized or field-on state. An electric field selectively applied across the liquid crystals may be used to switch between the field-off and field-on states.

There are three categories of liquid crystal material, namely cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic.

A more detailed explanation of operationally nematic liquid crystal material is provided in U.S. Pat. No. 4,616,903, issued Oct. 14, 1986, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, entitled ENCAPSULATED LIQUID CRYSTAL AND METHOD, assigned to Manchester R&D Partnership, and which disclosure is also hereby incorporated by reference.

Nematic curvilinear aligned phase (NCAP) liquid crystal material and devices using NCAP liquid crystal material are also described in the above-identified U.S. Pat. No. 4,435,047. A functional NCAP liquid crystal device may consist of NCAP film sandwiched between two electrode-coated substrates. The substrates may be polyester (PET) coated with indium tin oxide to form electrodes. The encapsulated NCAP material or film may comprise a containment medium containing plural volumes of operationally nematic liquid crystal. The plural volumes may be discrete or interconnected cavities or capsules. The interconnecting channels or passageways may also contain liquid crystal material.

A voltage source may be connected between the electrodes to selectively apply an electric field across the liquid crystal material. The liquid crystal material will scatter and/or absorb light in the field-off state and transmit light in the field-on state. Thus, the liquid crystal film may be switched between a highly translucent state (field-off) and a transparent state (field-on).

The NCAP film may be used in the construction of windows and the like. Such apparatus are described in U.S. Pat. No. 4,749,261, issued Jun. 7, 1988, entitled SHATTER-PROOF LIQUID CRYSTAL PANEL WITH INFRARED FILTERING PROPERTIES, assigned to Taliq Corporation. A window may be fabricated by laminating the electrode-coated substrate that supports the NCAP film to a window surface, for example glass or sheet plastic.

In the unpowered condition or field-off state, such windows provide privacy, glare control, shading, and daylighting by virtue of their light scattering properties. In the powered condition or field-on state, the windows are clear and provide visibility, which creates work and living spaces that are light and open, and let in views.

A problem associated with the use of encapsulated liquid crystal materials in architectural glazing products, such as windows, is that the material appears clear only over a finite viewing angle. At a normal viewing angle (0°), the material possesses minimum scattering or haze. However, the haze increases with an increase in the viewing angle, i.e., the observer moves off-axis, and this may be objectionable as it tends to obscure images when it is desired that maximum clarity be provided in the powered state.

This effect is caused by the mismatch of the refractive indices of the containment medium and the liquid crystal material. Liquid crystal materials useful in such applications have anisotropic refractive indices, with the refractive index along the long molecular axis typically higher than along either of the two short molecular axes. The refractive index along the long molecular axis is called the extraordinary index of refraction, while the refractive index along the short molecular axis is called the ordinary index of refraction.

If the ordinary refractive index of the liquid crystal material is matched to the refractive index of the containment medium, light incident on the material at a normal angle provides minimum scattering in the field-on state, since the match of the refractive indices of the liquid crystal material and the containment medium is optimized. At increased viewing angles, however, for one polarization of incident light, the effective refractive index of the liquid crystal material is higher than its ordinary refractive index; that is, the effective refractive index of the liquid crystal material appears to be an admixture of its ordinary and extraordinary indices of refraction. This results in increased scattering and thus haze as the viewing angle moves away from normal.

This haze in the field-on state is also higher, at any viewing angle and RMS voltage, if the film is powered by a sine-wave power source rather than by a square wave power source. As is known, a sixty cycle sine-wave power source is an alternating current source wherein the applied voltage switches from a positive to a negative voltage (and then back) sixty times a second. As a result, the applied voltage on the film necessarily is at zero voltage one-hundred and twenty times a second for short periods of time. Since encapsulated films may have very fast response times, the film turns partially off during these zero crossing periods. Since the human eye cannot follow such a rapid response, it averages such decay behavior, and as a result the film appears to be hazy. This increased haze is objectionable.

In view of the above, a square wave power supply is typically utilized to power encapsulated liquid crystal materials. While such a power source also crosses zero volts one-hundred twenty times a second, it does so much more rapidly than the sine-wave power source. A square wave power supply reverses polarity almost instantaneously. Thus, the liquid crystal material does not have time to switch between a distorted and aligned state. Therefore, the match between the ordinary refractive index of the liquid crystal and the refractive index of the containment medium is maintained during each cycle. As such, additional haze is not caused by application of the electrical field. However, the use of a square wave power supply adds cost and complexity to any product, such as architectural glazing products, incorporating an encapsulated material.

Accordingly, an object of the present invention is to provide an encapsulated liquid crystal material that has low haze over a wide viewing angle.

Another object of the present invention is to provide an encapsulated liquid crystal material that may be powered by a sine-wave power source and has low haze over a wide viewing angle.

BRIEF SUMMARY OF THE INVENTION

The present invention is directed to a liquid crystal apparatus that includes a low birefringence encapsulated liquid crystal material in a containment medium. The liquid crystal material has an extraordinary index of refraction and an ordinary index of refraction. The difference between the extraordinary index and the ordinary index of the liquid crystal material is between about 0.050 and 0.115. The index of refraction of the containment medium is greater than the ordinary index of refraction of the liquid crystal material.

The liquid crystal material can be an operationally nematic liquid crystal. This liquid crystal material is contained in plural volumes in the containment medium. A pleochroic or dichroic dye may be in solution with the liquid crystal material. The dye provides an energy control function.

DESCRIPTION OF THE DRAWINGS

Additional features of the invention will be evident from the following description taken in conjunction with the accompanying drawings wherein.

DESCRIPTION OF THE PREFERRED EMBODIMENTS

Figure 1:
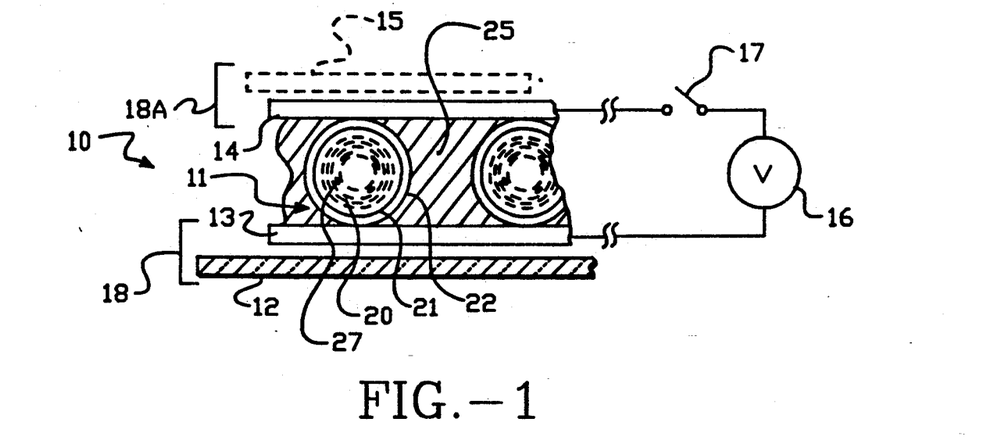
FIG. 1 is a schematic view illustrating a NCAP liquid crystal apparatus.

Referring now to the drawings, attention is first directed to FIG. i. FIG. 1 shows a NCAP liquid crystal apparatus indicated generally by reference numeral 10 of the type disclosed in U.S. Pat. No. 4,435,047. The apparatus includes a NCAP liquid crystal film 11 supported on a substrate 12 having an electrode 13 located thereon. The apparatus also comprises a second electrode 14 mounted on substrate 15. For the sake of convenience, substrate 12 and electrode 13 may also be referred to as electrode coated substrate 18, and, similarly, substrate 15 and electrode 14 may be referred to as electrode-coated substrate 18A.

The NCAP liquid crystal film 11 includes a liquid crystal material 20 more or less contained within the confines of the interior volume 21 of a capsule or droplet 22. As is known, a plurality of such capsule-like volumes are dispersed throughout a containment medium 25. The liquid crystal 20 is located in such capsules and in any interconnecting passageways in the containment medium between the capsules. The containment medium supports the liquid crystal material, protects it from the environment, and determines the direction orientation of the liquid crystal. The containment medium may comprise a polymer such as polyvinyl alcohol or, preferably, a latex material such as Neorez R-966 (refractive index of about 1.491) or R-967 (refractive index of about 1.482) available through Polyvinyl Chemicals, Wilmington, Mass. Other suitable containment media would be those with a refractive index up to about 1.51.

A pleochroic or dichroic dye 27 may be mixed with the liquid crystal material to form a solution therewith. The molecules of the dye generally align with the molecules of the liquid crystal material. Therefore, such dyes will tend to function optically in a manner similar to that of the liquid crystal material in response to a changing parameter, such as an application or non-application of electric fields across the liquid crystal material.

The encapsulating or containment medium should be totally unaffected by and should not affect the dye material. On the other hand, the dye should be oil-soluble and not subject to absorption by the water phase or polymer phase of the containment medium.

A voltage may be applied to electrode-coated substrates 18 and 18A, and hence across liquid crystal film 11 from a voltage source 16. Voltage source 16 is connected to electrode-coated substrates 18 and 18A by electrical leads and through selectively closeable switch 17. When switch 17 is closed, a voltage is applied across electrode-coated substrates 18 and 18A causing the liquid crystal molecules and dye to align with the field thereby becoming optically transmissive. When switch 17 is open and no voltage is applied, the liquid crystal and dye scatter and/or absorb light.

As noted, certain dyes are able to align themselves with the liquid crystal material, as they are rod-like in shape. The absorption of these dyes is dependent upon the relative orientation of the long axis of the dye molecule and the electric field vectors of the incident light. In the powered state, the dyes are aligned such that the electric field vectors of the incident light cannot interreact with the transition dipole, i.e. absorption direction, of the dye molecules. Thus, the powered state is both light and transparent, while the unpowered state is scattering and dark, since in the unpowered condition, the dye molecules have arranged themselves in an essentially random fashion and can absorb light. The scattering characteristics of the NCAP cell appear unaffected by the presence of the dye.

As noted, dye 27 in the liquid crystal 20 will absorb some of the light transmitted therethrough, and the degree of such absorption is a function of whether an electric field is applied to the liquid crystal material and of the magnitude of that field. Preferably, such absorption in the field-on condition of a liquid crystal should be zero or as close to zero as possible to maximize transmission of incident light.

In window constructions, mounting substrates 12 and 15, and electrodes 13 and 14 are optically transparent. As such, the liquid crystal apparatus 10 is capable of controlling the transmission of light therethrough in response to an electric field applied across electrode-coated substrates 18 and 18A.

Figure 2:
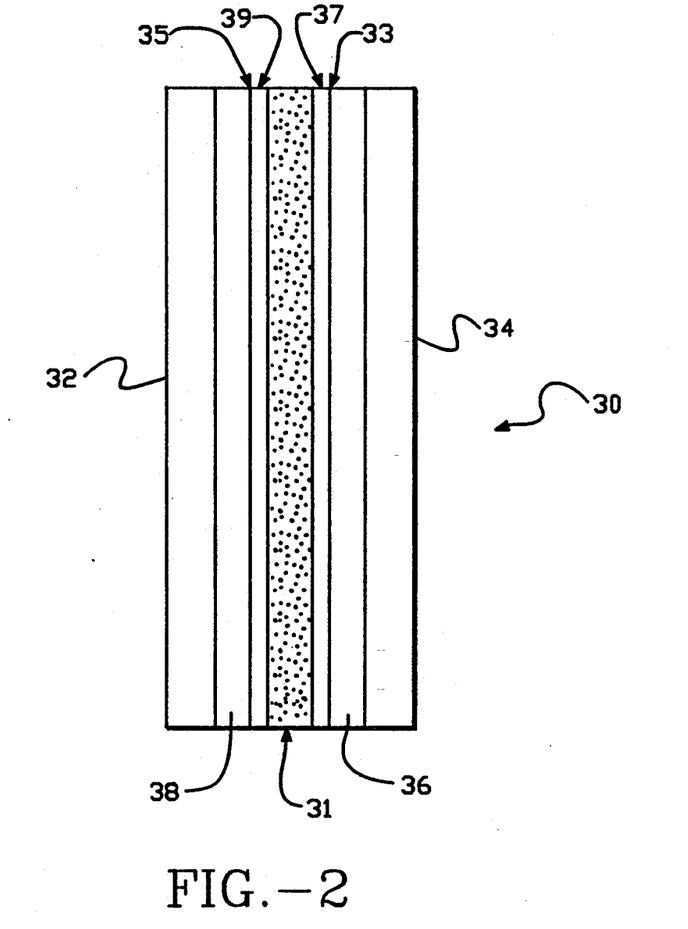
FIG. 2 is a schematic view illustrating a window construction incorporating an encapsulated liquid crystal material.

FIG. 2 illustrates a dual-laminated window construction 30. As shown, the window includes glass panels or sheets 32 and 34 between which is disposed a liquid crystal apparatus of the type just described. Specifically, the liquid crystal apparatus includes a layer of encapsulated liquid crystal material 31 sandwiched between polyester substrates 33 and 35 on which are formed indium tin oxide (ITO) electrode layers 37 and 39. A pleochroic or dichroic dye 27 is mixed with the liquid crystal material. An optically-transparent adhesive or inner layer 36 adheres glass panel 34 to substrate 33. Similarly, an inner layer 38 adheres glass panel 32 to substrate 35. One of the more commonly used glass inner layers is polyvinylbutyral (PVB).

As noted, in the field-off state, the molecules of liquid crystal 20 (see FIG. 1) are shown to be distorted by capsules 22 containing the liquid crystal. An array of such molecules will scatter and/or absorb light from all directions since the liquid crystal material as a whole has a random orientation. More specifically, light traveling through film 31, for example, sees a mismatch in the refractive index between the containment medium and the liquid crystal material. The light encounters many liquid crystal and containment medium interfaces, so that it is bent a number of times. Also as noted, the dye alignment follows the alignment of the liquid crystal. Therefore, when the liquid crystal structure is in this distorted alignment, the dye will provide a relatively substantial amount of light absorption.

Figure 3:
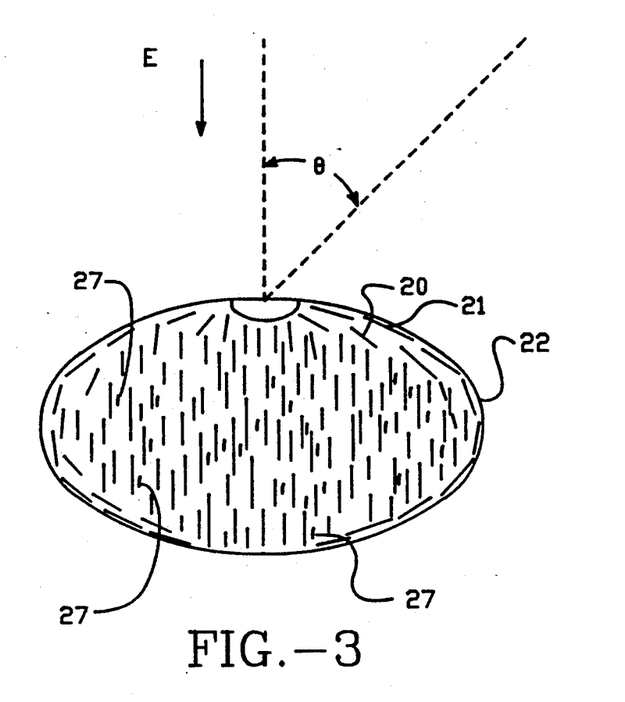
FIG. 3 is a schematic view illustrating a capsule of an encapsulated liquid crystal material.

As shown by FIG. 3, in the field-on state, the electric field E causes the molecules of the liquid crystal to align in relation to the electric field; that is, the liquid crystal director is twisted to lie parallel to the electric field (perpendicular to the capsule walls). Now the long axes of the liquid crystal molecules lie parallel to the direction of light, but perpendicular (and inaccessible) to both electric field vectors. Since the refractive index of the containment medium ($n_{con}$) and that of the short axis of the liquid crystal molecules ($n_o$=ordinary index of refraction) are matched, there are effectively no interfaces and thus no scattering. The film then transmits light and appears clear. In this state, light absorption by the dye is minimized.

As the magnitude of the electric field is increased or decreased, the amount of distortion of the liquid crystal material will vary, and the amount of absorption by the dye also will correspondingly vary. The dye thus absorbs visible light (approximately 425 to 675 nanometers) in the field-off state. As discussed, in the field-on state, light is not absorbed by the dye, and it passes through the layer of liquid crystal material and dye. The change in the degree of absorption by the dye between the field-on and field-off states provides an energy control function. That is, in the field-off state, the dye will reduce the amount of electromagnetic radiation entering a room or other enclosure, for example.

The above description holds for light entering normal ($\theta = 0°$) to the encapsulated liquid crystal material, where the ordinary refractive index is matched to the refractive index of the containment medium. Light entering at an angle ($\theta > 0°$) will have a component of its electric field aligned with the refractive index of the long axis of the liquid crystal material ($n_e$=extraordinary index of refraction). Thus, the effective refractive index of the liquid crystal ($n_{eff}$) will be greater than $n_o$. As such, light will begin to be scattered. Thus, in the field-on state, the film will have a hazy appearance when viewed off-axis, even at high voltages.

The present invention is directed to, among other things, a liquid crystal apparatus in which this off-axis haze is reduced. Specifically, the liquid crystal is selected to have a low birefringence ($\Delta n$) and its ordinary refractive index ($n_o$) is selected to be less than the refractive index of the containment medium ($n_{con}$) The low birefringence of the liquid crystal material offers a number of advantages. First, with a low birefringent liquid crystal material, $n_{eff}$ is only weakly dependent upon the viewing angle $\theta$ (see FIG. 3). This means that the haze of the film, which depends on $n_{eff}$, will be a weak function of the viewing angle. In this way, the film maintains a constant level of haze over a wider viewing angle. Second, a low birefringence liquid crystal material reduces the mismatch of $n_{con}$ to $n_e$. This results in a reduction in the level of haze at increased viewing angles $\theta$.

Preferably, the difference ($\Delta n$) between $n_0$ and $n_e$ should be greater than 0.050 but less than 0.115 ($0.050 < \Delta n < 0.115$). For values of $\Delta n$ lower than 0.050, light scattering in the unpowered state will decrease significantly, and the encapsulated liquid crystal material will be less desirable due to this effect. If $\Delta n$ is higher than 0.115, the haze becomes a strong function of the viewing angle, and the viewing angle range is significantly restricted. Examples of suitable liquid crystal materials are ZLI 1800-000 ($\Delta n$ is about 0.077) and ZLI 1646 ($\Delta n$ is about 0.080) available through E. Merck Chemicals, Darmstadt, Germany. These and other suitable materials have a $\Delta n$ of between about 0.080 and 0.100.

The use of liquid crystal materials having a $\Delta n$ in this range also places restrictions on the droplet or capsule size 22. For instance, mean droplet diameters less than 2 microns become less useful since droplets of that size are ineffective at scattering light, especially longer wavelengths of light (red light). Thus, the ability of the encapsulated material to hide images is greatly reduced. For very large droplets (>8 microns in diameter) the scattering effectiveness of the film is low, again producing undesirable films. Thus, it is preferred that the mean volume diameter of the droplets be between about 2 and 8 microns.

Setting $n_{con}$ above $n_O$ produces an increased level of haze at normal viewing angles ($\Theta = 0°$), compared to films with a match between $n_{con}$ and $n_O$. However, at greater viewing angles ($\theta > 0°$), $n_{eff}$ increases, and at some non-zero angle $\theta$, $n_{eff} = n_{con}$. At this angle, the film will possess minimum haze. Such a film will have an exceptionally high viewing angle range, since this effectively increases that range where the difference between $n_{eff}$ and $n_{con}$ are acceptable.

For example, assume for a liquid crystal material with a specific $\Delta n$, for example, $\Delta n=0.080$, there is an acceptable viewing angle range of $\theta=\pm 30°$ from the viewing angle that possesses minimum haze, since the mismatch of $n_e$ and $n_{con}$ increases only moderately over that range. This means that if the film is viewed from an angle $\theta$ where $n_{eff}=n_{con}$, then the film can be viewed up to 30° away from that angle and it will still possess acceptable haze. A wide viewing angle range thus results from using a low $\Delta n$ birefringence liquid crystal material.

If the liquid crystal material and the containment medium are chosen such that $n_O=n_{con}$, the film possesses minimum haze at a viewing angle of $\theta=0°$. In this example, the film will provide an acceptable viewing range of $\pm 30°$. However, if the materials are selected such that $n_O$ is less than $n_{con}$, then the minimum haze will be at some angle $\theta$ greater than $0°$. If the minimum haze is set to lie at $\theta=\pm 30°$, the acceptable viewing range is $\pm 60°$ from the normal. The haze is higher than the minimum haze at $\theta=0°$, but is still acceptable due to the low $\Delta n$ of the liquid crystal material. As the viewing angle increases, the haze decreases until $\theta=\pm 30°$. At this point, the haze is minimized. The haze then increases with increasing viewing angle, but remains acceptable until $\theta=\pm 60°$ from the normal. This provides an effective viewing angle range of 120°.

Also, there is a limit on how great the mismatch between $n_O$ and $n_{con}$ can be at $\theta=0°$. If this mismatch is too great (i.e. $n_{con}>>n_O$), the haze at 0° will be objectionable. At present, it is believed that the mismatch between $n_O$ and $n_{con}$ should be less than 0.020, and most preferably no more than 0.010.

Additionally, using a low $\Delta n$ liquid crystal material, and a containment medium and liquid crystal material wherein $n_O<n_{con}$ provides an encapsulated material more suitable for operation by a sine-wave power source. As discussed above, if the liquid crystal material within an encapsulated film turns off during the zero-crossing of the applied sine-wave voltage, there is an increase in perceived haze. This is due to the fact that at normal viewing angles, $n_{eff}$ increases as the liquid crystal begins to return to its distorted (field-off) state. Thus, from the above discussions, it can be seen that perceived haze caused by sine-wave power operation may be minimized by using a low $\Delta n$ liquid crystal material wherein $n_O<n_{con}$. In such a case, as the liquid crystal molecules begin to distort, $n_{eff}$ increases only slowly, which minimizes perceived haze. Additionally, as the liquid crystal molecules rotate, the match between $n_{eff}$ and $n_{con}$ actually improves. Thus, there is a wide range of orientation angles for the film over which the perceived haze is low. Thus, it is less critical that the liquid crystal molecules do not relax during the zero-crossing of the applied AC voltage. A sine-wave source can be thus utilized.

An additional benefit provided by the use of a low $\Delta n$ liquid crystal is that the liquid crystal molecules need not be perfectly aligned with the electric field to provide low off-axis haze. As such, a reduction in operating voltage is obtained.

A method for making an encapsulated liquid crystal material of the type discussed above is set out below.

EXAMPLE 1

A method may comprise the following materials and procedure: 67.6 grams of the liquid crystal ZLI 1646 (available through E. Merck, Darmstadt, Germany) is mixed with 0.4 grams of the surfactant IGEPAL CO-610 (available from GAF Chemicals Corp., Wayne, N.J.) and 0.4 grams of the surfactant DOW 5098 (available from Dow Chemical, Midland, Mich.). The $\Delta n$ of the liquid crystal material is about 0.080, and its $n_O$ is about 1.481 at 20° C. This mixture is blended for 2-3 minutes at 500 RPM, using a Dyna-Mix variable-speed rotary mixer (available from Fisher Scientific Inc., Pittsburgh, Pa.). Thereafter, 102.4 grams of Neorez R-967 (available through Polyvinyl Chemicals, Wilmington, Mass.), containing 40% of latex solids by weight, is added. The mixture is emulsified at about 6,000 RPM until the liquid crystal is emulsified and the mixture homogeneous. The preferred mean volume diameter of the liquid crystal droplets is about 3.5-4.5 microns, as determined using a Coulter Counter Model TAII particle size analyzer (available from Coulter Electronics, Inc., Hialeah, Fla.). Then add, slowly and with mixing, 12.3 grams of a 10% (by weight) solution of PVPK-90 in water (available from GAF Chemicals) and 6.2 grams of a 50% (by weight) solution of the cross-linking agent CX-100 in water (available from Polyvinyl Chemicals). 39.4 grams of water is added, and the mixture stirred for several minutes at 600 RPM, until the mixture is homogeneous. The mixture is then degassed. This material may then be layered with a 0.003" Bird doctor blade or other suitable means onto an appropriate electrode-coated substrate and dried. Additionally, a second electrode-coated substrate may be laminated to the coating to make an operating device. The index of refraction of the containment medium ($n_{con}$) is about 1.487 for this material.

The refractive index value of the containment medium given above in Example 1 as 1.487 is the value that the containment material achieves in the NCAP film, where it may absorb an appreciable amount of liquid crystal. The absorption of liquid crystal raises the refractive index of the containment medium in the film over that of the pure material (about 1.482), dependent on the amount absorbed and the refractive index values of the liquid crystal. Thus, in choosing the nematic and containment media for a film with a wide viewing angle, the effect of the nematic solubility in the polymer matrix must be taken into account.

The above method may be repeated using in place of the liquid crystal material ZLI 1646, the liquid crystal material MT-88151 (available from E. Merck Chemicals) having a $\Delta n$ of about 0.097 and a $n_O$ of about 1.4850.

The above method also may be modified by using a 2% M137 blue dye (available from Mitsui Toatsu) dissolved in the liquid crystal material MT-88151.

EXAMPLE 2

The black dichroic dye SI-428 is dissolved into 67.6 grams of the liquid crystal ZLI 1646. All other processing steps remain the same as in Example 1. The resulting film possesses energy-control features (e.g., an electrically-controllable dye absorbance), as well as a wide viewing angle with low haze in the powered state.

EXAMPLE 3

The refractive index of the containment medium can also be adjusted by blending another polymer material with the main polymer. One example of such a blending material is Witcobond XW (available from Witco Corporation, New York, N.Y.), containing 55% of an epoxy polymer dispersed in water. This particular material is useful with latex-based polymers (like the R-967) as it can be added to the NCAP emulsion without causing coating defects in the subsequent NCAP coating. It also blends with the latex polymer in such a way to form a clear film. As an example, to the emulsion specified in the previously described Example 1 (with ZLI 1646 as the nematic liquid crystal) is slowly added 7.5 grams of the Witcobond XW epoxy with stirring. The addition of this material raises the refractive index of the containment medium to 1.498, which serves to move the minimum haze angle from 20° to 40°, due to the greater mismatch between $n_{con}$ and $n_O$.

Figure 4:
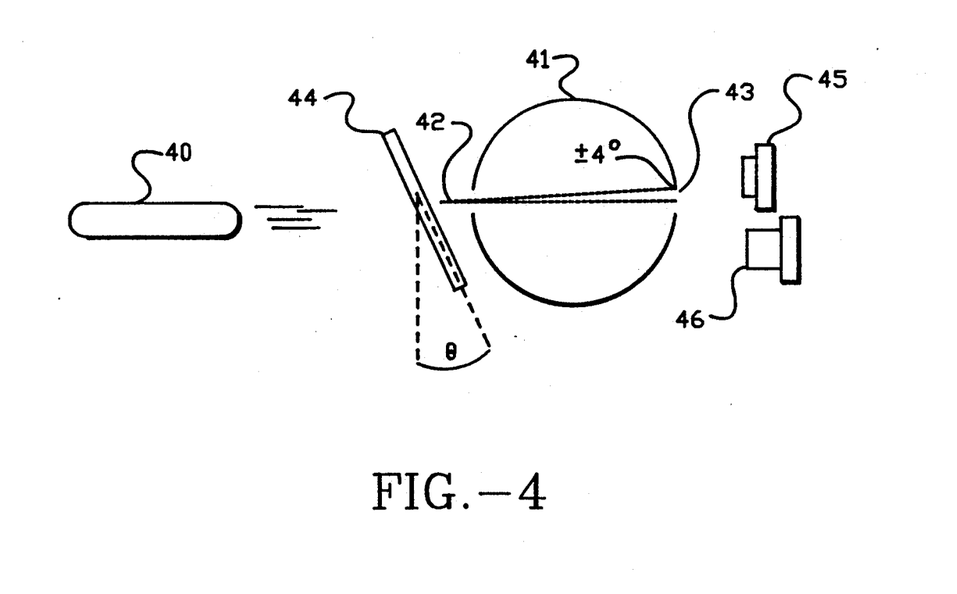
FIG. 4 is a schematic illustration of a device for measuring haze at different viewing angles.

The haze produced by an encapsulated liquid crystal material may be measured by directing a collimated beam of white light at some angle relative to the surface of the material. The system shown in FIG. 4 is suitable for measuring haze as a function of viewing angle.

As shown, the system comprises a Xenon light source 40 available from Oriel Corp., Stratford, Conn., which is used to produce a collimated light beam approximately ⅛ inch in diameter. An integrating sphere 41 is arranged so that the beam passes through both the center of the entrance port 42 and exit port 43. The integrating sphere may be approximately 10 inches in diameter, and may be purchased from a source such as Labsphere, Inc., North Sutton, N.H. The size of the entrance port is made so that the angular width of the hole is plus or minus 4° from the beam direction. The NCAP sample is placed at a distance of approximately 3.5 inches from the entrance port in a rotatable mounting system 44. With the NCAP sample fixed at a particular angle, two measurements are made. First, the exit port is covered by a reflecting cover 45, so that all light that enters the sphere is detected. The light intensity measured by the integrating sphere in this case is the 100% reference value. Secondly, the reflecting cover is replaced by a light trap 46 consisting of a darkened, plugged cylinder. Light that passes through the film without scattering is captured by the trap, and is not detected by the integrating sphere. Light that is scattered by more than ±4° is not trapped, and so is detected by the sphere. The % haze is then defined as the ratio of these two intensities:

$$\% \text{ haze} = \frac{\text{light detected using light trap}}{\text{light detected using reflecting trap}} \times 100$$

It is most desirable that a sample have low haze when powered. The NCAP film sample can then be rotated to a new angle and remeasured as above. The system just described provides haze measurements which correlate fairly well with that which would be seen by an observer.

Figure 5:
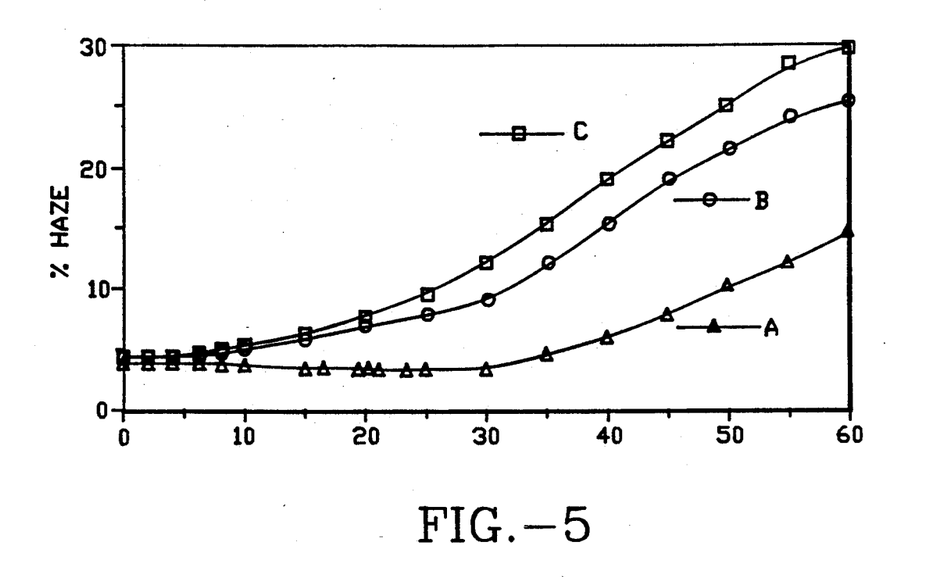
FIG. 5 graphically represents haze as a function of viewing angle for different NCAP liquid crystal materials.

The results of such measurements may be plotted on a graph wherein the y-axis represents the off-axis haze as a percentage, and the x-axis represents the viewing angle in degrees. A sample plot for NCAP films powered with a 100 volt square wave source is shown in FIG. 5. Curve A represents a low birefringence ($\Delta n$) NCAP liquid crystal material, and Curves B and C represent high $\Delta n$ NCAP liquid crystal materials. Specifically, the NCAP material represented by Curve A utilized the ZLI 1646 liquid crystal material having a $\Delta n$ of about 0.080. On the other hand, Curve B represents a NCAP film using a liquid crystal having a $\Delta n$ of about 0.123, and Curve C a NCAP film using ZLI 1840 liquid crystal (available from E. Merck) having a $\Delta n$ of about 0.143. As shown, the low $\Delta n$ liquid crystal NCAP material (Curve A) produces lower haze over a wider range of viewing angles.

Additionally, it is noted that a 4% haze, although noticeable by an observer, would be acceptable. However, a 20% haze would be perceived by most observers as unacceptable. As can be seen from FIG. 5, the low $\Delta n$ liquid crystal material produces acceptable haze-levels up to viewing angles of about plus or minus 60° from the normal (Curve A). On the other hand, the high $\Delta n$ materials (Curves B and C) produce unacceptable levels of haze (above 20% haze) at viewing angles between 30° and 40°.

Figure 6:
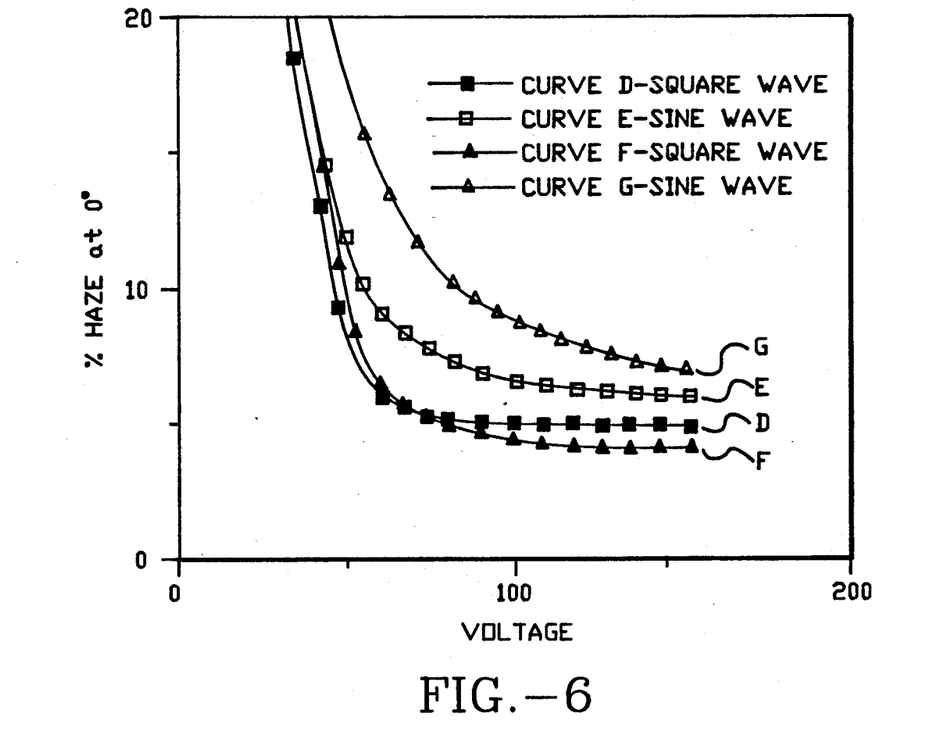
FIG. 6 graphically represents haze as a function of voltage for different NCAP liquid crystal materials.

FIG. 6 shows an example of the improvement in haze using a sine-wave power supply using low birefringent liquid crystals, compared to nematic liquid crystals with a high birefringence. Specifically, FIG. 6 is a plot of percent haze at a viewing angle of 0° as a function of voltage for both sine-wave and square wave power sources. Curves D and E represent a NCAP film using ZLI 1646 ($\Delta n = 0.080$) as the nematic and operated by a square wave and sine-wave voltage source, respectively. Curves F and G represent a NCAP film using a nematic liquid crystal with a $\Delta n$ of about 0.123 and operated by a square wave and sine-wave voltage source, respectively. It can be seen that for square wave power sources both materials (Curves D and F) show low haze values at 100V. However, at 100V, the sine-wave supply increases the haze of the $\Delta n = 0.123$ film (Curve G) dramatically, while there is a smaller penalty paid with the ZLI 1646 film (Curve E). The relaxation of the droplets during the 0V period of the sine-wave has a much smaller effect on the haze in the low $\Delta n$ material than on the high $\Delta n$ material, as described previously.

Having described preferred embodiments of the present invention, it will occur to those ordinarily skilled in the art that various modifications may be made to the disclosed embodiments, and that such modifications are intended to be within the scope of the present invention.

What is claimed is:

1. A liquid crystal apparatus comprising: an encapsulated liquid crystal material in a containment medium, said liquid crystal material containing a dye that conforms to the structure of the liquid crystal material, and having an extraordinary index of refraction and an ordinary index of refraction wherein the difference between said extraordinary index of refraction and said ordinary index of refraction is between about 0.050 and 0.115, and wherein the containment medium has an index of refraction greater than said ordinary index of refraction.

2. The liquid crystal apparatus of claim 1 disposed between two optically transparent panels to control transmission of light therethrough.

3. The liquid crystal apparatus of claim 2 further including a sine-wave power source for applying an electric field across said liquid crystal material to transmit light.

4. The liquid crystal apparatus of claim 1 wherein the difference between said extraordinary index of refraction and said ordinary index of refraction is between about 0.080 and 0.100.

5. The liquid crystal apparatus of claim 1 wherein the difference between the index of refraction of the containment medium and said ordinary index of refraction is not greater than about 0.020.

6. The liquid crystal apparatus of claim 1 further including two optically transparent panels between which the liquid crystal apparatus is disposed to form a window means wherein the liquid crystal apparatus controls transmission of light through said window means.

7. The liquid crystal apparatus of claim 1 wherein said dye is a pleochroic or dichroic dye.

8. The liquid crystal apparatus of claim 1 further including electrode means for applying an electric field across at least some of said liquid crystal material, electrical circuit means for providing electrical power to said electrode means, and said electrical circuit means including a sine-wave power source for applying said electric field without producing objectionable haze.

9. A window comprising two optically transparent panels between which is disposed an encapsulated liquid crystal material in a containment medium, said liquid crystal material containing a dye that conforms to the structure of said liquid crystal material, and having an extraordinary index of refraction and an ordinary index of refraction wherein the difference between said extraordinary index of refraction and said ordinary index of refraction is between about 0.050 and 0.115, and wherein the containment medium has an index of refraction greater than said ordinary index of refraction, and wherein said liquid crystal material is switchable between a field-on and field-off state by an application of an electric field from a sine-wave power source without producing objectionable haze levels.

10. The liquid crystal apparatus of claim 9 wherein the difference between the index of refraction of the containment medium and the ordinary index of refraction of said liquid crystal material is between about 0.010 and 0.20.

* * * * *

UNITED STATES PATENT AND TRADEMARK OFFICE
CERTIFICATE OF CORRECTION

PATENT NO. : 5,285,299
DATED : February 8, 1994
INVENTOR(S) : Drzaic, et. al.

It is certified that error appears in the above-indentified patent and that said Letters Patent is hereby corrected as shown below:

Column 4, line 5, replace "FIG. i" with --FIG. 1--.

Signed and Sealed this

Thirtieth Day of August, 1994

Attest:

BRUCE LEHMAN

*Attesting Officer*            *Commissioner of Patents and Trademarks*